(12) United States Patent
Jaslier et al.

(10) Patent No.: US 6,228,513 B1
(45) Date of Patent: May 8, 2001

(54) METHOD OF IMPROVING OXIDATION AND CORROSION RESISTANCE OF A SUPERALLOY ARTICLE, AND A SUPERALLOY ARTICLE OBTAINED BY THE METHOD

(75) Inventors: Yann Jaslier, Melun; Serge Alexandre Alperine, Paris; Jacques Louis Leger, Combs la Ville, all of (FR)

(73) Assignee: Societe Nationale d'Etude et de Construction de Moteurs d'Aviation "SNECMA", Paris (FR)

( * ) Notice: Subject to any disclaimer, the term of this patent is extended or adjusted under 35 U.S.C. 154(b) by 0 days.

(21) Appl. No.: 09/158,094

(22) Filed: Sep. 22, 1998

(30) Foreign Application Priority Data

Sep. 25, 1997 (FR) .................................................. 97 11925

(51) Int. Cl.[7] ........................... C23C 10/48; C23C 30/00; C22C 19/03; C23F 11/16
(52) U.S. Cl. ....................... 428/639; 428/652; 428/670; 428/680; 428/941; 416/241 R
(58) Field of Search ..................................... 428/610, 652, 428/639, 668, 680, 670, 941; 416/241 R (56) References Cited

U.S. PATENT DOCUMENTS

| 4,321,311 | 3/1982 | Strangman . |
|---|---|---|
| 4,401,697 | 8/1983 | Strangman . |
| 4,405,659 | 9/1983 | Strangman . |
| 4,826,738 | 5/1989 | Smeggil . |
| 4,880,614 | 11/1989 | Strangman et al. . |
| 4,895,201 | 1/1990 | DeCrescente et al. . |
| 4,916,022 | 4/1990 | Solfest et al. . |
| 5,015,502 | 5/1991 | Strangman et al. . |
| 5,344,510 | * 9/1994 | Allen et al. . |
| 5,427,866 | 6/1995 | Nagaraj et al. . |
| 5,443,789 | * 8/1995 | Harries et al. . |
| 5,538,796 | 7/1996 | Schaffer et al. . |
| 5,540,790 | 7/1996 | Erickson . |
| 5,624,721 | * 4/1997 | Strangman . |
| 5,922,148 | * 7/1999 | Irvine et al. . |

FOREIGN PATENT DOCUMENTS

| 0 370 838 | 5/1990 | (EP) . |
|---|---|---|
| 0 718 420 | 6/1996 | (EP) . |
| WO 95/12004 | 5/1995 | (WO) . |
| WO 96/13622 | 5/1996 | (WO) . |

* cited by examiner

Primary Examiner—Deborah Jones
Assistant Examiner—Jason Savage
(74) Attorney, Agent, or Firm—Oblon, Spivak, McClelland, Maier & Neustadt, P.C.

(57) ABSTRACT

A method of improving the oxidation and corrosion resistance of a superalloy article comprises providing a superalloy substrate having a sulphur content which is less than 0.8 ppm by weight, and depositing on the substrate a protective antioxidation coating having a sulphur content also less than 0.8 ppm by weight. A heat barrier layer may also be provided by depositing on the protective anti-oxidation coating a ceramic coating of columnar structure.

6 Claims, 7 Drawing Sheets

| SUPERALLOY | NICKEL BASE -EQUIAXIAL (IN100, HASTELLOY X) | NICKEL -MONOCRYSTALLINE BASED (AM1) |
|---|---|---|
| SULPHUR CONTENT IN PPM BY WEIGHT (GDMS) | 6-20 | 1-3 |
| SUB-LAYER | PLATINUM MODIFIED ALUMINIDE | PLATINUM MODIFIED ALUNMINIDE |
| WORKING LIFE (NUMBER OF 1hr/1100°C CYCLES) | 350-500 | 50-250 |

| ALLOY + SUBLAYER + HEAT BARRIER | NUMBER OF CYCLES TO SPALLING (SEVERAL SAMPLES) |
|---|---|
| AM1(0,2ppm)+ PLATINUM ALUMINIDE SUBLAYER (0,3ppm) | 585, 760, 1000 |
| AM1(0,85ppm)+ PLATINUM ALUMINIDE SUBLAYER (0,5ppm) | 56, 56, 56, 56 |

| SAMPLE | ALLOY | SUB-LAYER | AVERAGE SULPHUR CONTENT OF SUB-LAYER |
|---|---|---|---|
| 1 | AM1 | Pt | 6 ppm BY WEIGHT |
| 2 | AM1 + 300 ppm Y | Pt | 3 ppm BY WEIGHT |
| 3 | AM1 + 300 ppm Y | Pt WITH LOW SULPHUR CONTENT | 0.2 ppm BY WEIGHT |

METHOD OF IMPROVING OXIDATION AND CORROSION RESISTANCE OF A SUPERALLOY ARTICLE, AND A SUPERALLOY ARTICLE OBTAINED BY THE METHOD

BACKGROUND OF THE INVENTION

1. Field of the Invention

The invention relates to a method of improving the oxidation and corrosion resistance of a superalloy article and to a superalloy article obtained by the process.

The invention is applicable to all kinds of superalloys, and particularly to monocrystalline superalloys and to superalloys having a low grain boundary density and weakly alloyed with hafnium (hafnium concentration below 0.5% by mass).

2. Summary of the Prior Art

The makers of land and aeronautical turbine engines are always faced with demands to increase efficiency and reduce specific consumption. One way of responding to these demands is to increase the temperature of the burnt gases at the turbine inlet. However, this approach is limited by the ability of the turbine parts, such as the distributors or the rotor blades of the high-pressure stages, to withstand high temperatures. Refractory metallic materials called superalloys have been developed for these turbine parts. These superalloys are nickel, cobalt or iron based and provide the component with mechanical strength at high temperatures (creep resistance). At present the burnt gas temperature, which is typically 1600° C. for a modern engine, exceeds the melting point of the superalloys used, and the high-pressure stage blades and distributors are convection cooled by air at 600° C. taken from the compressor stages. Some of the cooling air which flows in the internal channels of the articles is discharged through ventilation apertures in the wall of the article to form a cold air film between the article surface and the hot gases.

In parallel to the adoption of sophisticated cooling techniques several generations of superalloy have been developed with increased creep resistance to meet the need to increase the temperature limit at the turbine inlet. The working temperature limit of these superalloys is of the order of 1050° C.

The improvements in superalloys have been made to the detriment of their oxidation and hot corrosion resistance, which had led to the development of coatings which protect against oxidation and corrosion. There are two kinds of protective coating. The first consists of nickel aluminide (NiAl) type coatings comprising atomic percentage of aluminum between 40% and 55%. These intermetallic coatings may be modified by the addition of chromium and/or a precious metal. The second consists of MCrAlY type metallic coatings where M denotes nickel or cobalt or iron or a combination of these metals. Both these kinds of protective coating form a film of aluminum oxide, called alumina, which insulates the metal below the coating from the external environment.

After the development of superalloys and techniques for cooling rotor blades and distributors, heat barrier coatings constitute the most recent technology for achieving significant temperature gains at the turbine inlet. Heat barrier technology consists of coating superalloy articles with a fine insulating ceramic layer whose thickness can vary from a few tens of microns to several millimeters. In most cases the ceramic layer consists of zirconia stabilised by yttria, which has the advantages of being a poor heat conductor and having good chemical stability at high temperatures. The ceramic layer may be deposited by heat spraying or by electron beam physical vapour deposition, or EB-PVD for short. EB-PVD is the preferred method of making a deposition on the body of blades and distributors, mainly because the coating has a good surface texture and obstruction of the ventilation holes in the articles can be monitored. The ceramic layer deposited by EB-PVD consists of microcolumns perpendicular to the article surface. This microstructure enables the coating to adapt to thermal or mechanical deformations in the plane of the superalloy substrate.

The main difficulty with heat barrier technology is to ensure satisfactory adhesion of the ceramic layer to the article it is required to protect. In contrast to ceramic coatings prepared by hot spraying, adhesion of a ceramic layer deposited by EB-PVD is not mechanical but consists of chemical bonds with the article surface. The ionic conductivity and the porous structure of a zirconia-based ceramic layer is such as to permit, at high temperatures, the diffusion of oxygen from the ambient medium towards the interface with the metallic article, so that the metal oxidises.

If adhesion between the ceramic layer and the superalloy article is to be satisfactory the oxide film formed at the interface between the superalloy and the ceramic layer by EB-PVD must adhere both to the metal of the article and to the ceramic layer, have good mechanical strength, and limit oxidation of the metal below. To increase adhesion of the ceramic layer to the superalloy article it is known to interpose between the superalloy and the EB-PVD ceramic layer a sublayer which serves as a growth site for an alpha alumina film whose thickness varies from a few tenths of a micron to several microns. The EB-PVD heat barrier sublayers used so far are coatings developed to protect superalloys against high-temperature oxidation. These coatings have the property of being alumino-forming, i.e. forming an alumina film in the presence of oxygen at high temperatures. U.S. Pat. Nos. 4,321,311, 4,401,697 and 4,405,659 teach the use of MCrAlY type coatings as a heat barrier sublayer. U.S. Pat. Nos. 4,880,614, 4,916,022 and 5,015,502 disclose the advantage of using coatings belonging to the aluminide family as a heat barrier sublayer.

It is also known from U.S. Pat. No. 5,427,866 and published European patent application 0718420 to deposit the ceramic layer directly on a superalloy base whose surface has been modified by a precious metal of the platinum group. The superalloy surface is modified by deposition of an electrolytic platinum layer several microns thick on the base superalloy, followed by a vacuum diffusion heat treatment at a temperature between 1000° C. and 1150° C. The platinum reacts with the aluminum of the base superalloy to form a complex platinum aluminide incorporating a number of elements including nickel.

It is well known that superalloy oxidation resistance can be improved by the addition of yttrium to the superalloy, the weight percentage of yttrium varying from a few tens of ppm (ppm denoting parts per million) to several percent. Adding yttrium considerably improves the adhesion of the oxide films. Some other elements such as hafnium, zirconium, cerium and in general the lanthanides also help to improve the adhesion of the alumina layers. This effect of adding yttrium and/or related elements, called reactive elements, is exploited in U.S. Pat. No. 5,262,245 which describes a heat barrier coating having a ceramic layer deposited directly on a superalloy covered by an alumina film without the use of a sublayer. The absence of sublayer reduces production costs and weight and gives improved control over the geometry of thin-walled blade bodies.

The beneficial effect on adhesion of the oxide layers achieved by adding yttrium and/or reactive elements is mainly due to the trapping of the sulphur impurity at the core of the alloy in the form of yttrium sulphides or oxysulphides. The sulphur trapped by the addition of reactive elements is not free to move at high temperatures and cannot segregate at the oxide/metal interfaces.

The bad effect of residual sulphur on the adhesion of the alumina layers formed on superalloys has been shown by the experiments of Smialek et al in "Effect of Sulphur Removal on Scale Adhesion to PWA 1480", Metallurgical and Materials Transactions, A Vol. 26A, February 1995. These experiments consisted of submitting to cyclic oxidation MiCrAl specimens which had been desulphurized by heat treatment in hydrogen. The oxidation behaviour of a desulphurized alloy is found to be comparable with that of an alloy doped by the addition of yttrium or other reactive elements. U.S. Pat. No. 5,538,796 describes the deposition of an EB-PVD ceramic layer directly on a base alloy desulphurized to a content of less than 1 ppm and covered by an alumina film without using a sublayer and without adding yttrium to the superalloy. This U.S. patent specifies that aluminide coatings have a sulphur content which can vary from 8 to 70 ppm, which is a strong argument against using them as EB-PVD heat barrier sublayers on a superalloy whose sulphur content has previously been reduced to less than 1 ppm.

However, to improve their creep resistance the new generation superalloys usually include small amounts of aluminum and chromium. These amounts are not enough to ensure the longevity of the alumina layer formed directly on these superalloys without a sublayer, even after the alloy has been given a desulphurizing treatment. The life of the alumina layer in the absence of a sublayer is short because the reservoir of aluminum is low, as is the reactivity of the aluminum in the superalloy. The low chromium content of the superalloy does not enable the chromium to enhance the reactivity of the aluminum.

The various coatings or heat barrier sublayers used to increase adhesion of the ceramic layers deposited on the superalloys and to improve the oxidation resistance thereof are very effective on polycrystalline alloys, but usually perform worse on monocrystalline alloys. Indeed, we have found that the spalling resistance of heat barriers deposited by an EB-PVD process and the oxidation behaviour of the antioxidation coatings is much lower on monocrystalline alloys than on polycrystalline alloys.

Figure 1:
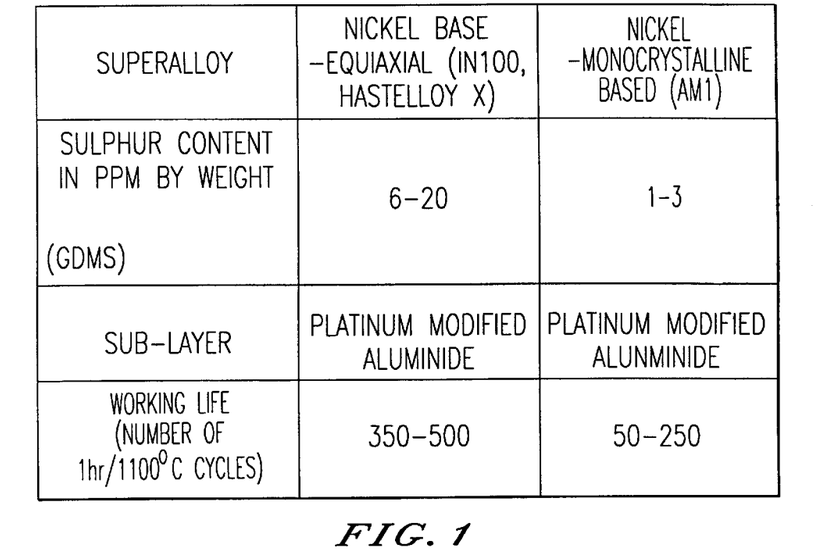
FIG. 1 is a table comparing the working lives of heat barriers deposited on a monocrystalline superalloy and on a polycrystalline superalloy.

By way of example FIG. 1 shows the working life ranges of EB-PVD heat barriers deposited on the polycrystalline superalloys known as IN100 and Hastelloy X and on the monocrystal known as AM1, the superalloys having first been coated with a platinum-modified aluminide sublayer. The alloy AM1 is a nickel based alloy containing, by weight, 7.5% Cr, 6.5% Co, 2% Mo, 8% Ta, 5.5% W, 1.2% Ti and 5.3% Al. The alloy IN100 is a nickel based alloy containing, by weight, 13%–17% Co, 8%–11% Cr, 5%–6% Al, 4.3% to 4.8% Ti, 2% to 4% Mo, 0.7% to 1.2% V, 0.03% to 0.06% Zr, and 0.01% to 0.014% B. The alloy Hastelloy X is a nickel based alloy containing, by weight, 20.5% to 23% Cr, 17% to 20.0% Fe, 8% to 10% Mo, 0.5% to 2.5% Co, and 0.2% to 1.0% W.

The working life of a heat barrier is expressed in terms of the number of heat cycles until spalling of 20% of the surface of the coated specimen occurs. A cycle consists of a step of one hour at 1100° C. with a temperature rise time of 5 minutes and a cooling time to a temperature below 100° C. of 10 minutes.

FIG. 1 shows that the spalling resistance of an EB-PVD heat barrier is less on the monocrystal AM1, whereas the unprotected AM1 has an intrinsic oxidation resistance much greater than that of the polycrystal IN100, which is an alumino-forming superalloy strongly loaded with titanium, and of Hastelloy X which is a chromo-forming alloy. Also, it was observed that protective coatings such as the MCrAlY coatings and the single aluminides modified by chromium or by a precious metal have an oxidation resistance on moncrystals very much less than that observed on polycrystals. Consequently, none of the known coatings used alone or as a heat barrier sublayer has an adequate working life when deposited on a monocrystalline superalloy.

Using scanning electron microscopy it was found that early spalling of an EB-PVD ceramic layer deposited on a monocrystalline superalloy previously coated with a sublayer corresponds to the propagation of a crack at the interface between the alumina film and the metal of the sublayer. This kind of rupture leads to poor adhesion of the oxide film to the metal, which at temperatures above 850° C. may be caused by segregation of the element sulphur at the oxide/sublayer interface.

The sulphur content of the alloy AM1 is between 1 and 3 ppm by weight. This content is appreciably lower than that measured in Hastelloy X (20 ppm) and in IN100 (6–10 ppm), yet on these substrates the spalling resistance of the EB-PVD ceramic layer is better.

SUMMARY OF THE INVENTION

It is an object of the invention to improve the oxidation and corrosion resistance of a superalloy article comprising a protective anti-oxidation coating and optionally a heat barrier.

It is another object of the invention to obtain heat barrier coatings having a greatly increased resistance to spalling at high-temperatures.

To this end, the invention resides in reducing the free sulphur content jointly in the superalloy and in the protective antioxidation coating to obtain a free sulphur concentration at least less than 0.8 ppm by weight, and preferably below 0.2 ppm by weight.

Accordingly the invention provides a method of improving the oxidation and corrosion resistance of a superalloy article comprising the steps of:
 providing a superalloy substrate having a sulphur content less than 0.8 ppm by weight; and
 depositing on said superalloy substrate a protective anti-oxidation coating having a sulphur content less than 0.8 ppm by weight.

Preferably, the sulphur content in the substrate and in the coating is below 0.2 ppm by weight.

If the article is also to be provided with a heat barrier coating the process comprises an additional step consisting of depositing a ceramic coating of columnar structure on the protective antioxidation coating.

The invention also provides a superalloy article having improved oxidation and corrosion resistance, said article comprising:
 a superalloy substrate having a free sulphur content less than 0.8 ppm by weight; and
 a protective antioxidation coating having a sulphur content less than 0.8 ppm by weight.

Preferably, the protective coating is an aluminide coating modified by at least one metal selected from the group consisting of nickel, platinum, palladium, ruthenium, rhodium and chromium.

Optionally, the protective antioxidation coating may serve as a heat barrier sublayer on which a ceramic coating of columnar structure is deposited.

Further preferred features and advantages of the invention will become apparent from the following non-limitative detailed description of the invention, including preferred embodiments and examples, with reference to the accompanying drawings.

DETAILED DESCRIPTION OF THE INVENTION

The sensitivity of alloys to sulphur impurity is due to the strong tendency of this element in solution to segregate at free surfaces, at grain boundaries and at the non-cohesive interfaces available in the material. For a given concentration of free sulphur in the alloy, the sulphur fraction segregated at the oxide/metal interface is greater and more critical to the adhesion of the oxide layer the lower is the density of available segregation sites in the superalloy coated by a heat barrier sublayer.

This is why the spalling resistance of an EB-PVD ceramic layer on a monocrystalline alloy is very sensitive to the presence of sulphur, since the interface between the metal of the sublayer and the alumina film is one of the rare interfaces available in the material where the sulphur impurity can segregate. Even if an aluminide type sublayer contains individual grains, the latter are relatively large in size and the density of grain boundaries in an aluminide-coated monocrystalline alloy remains generally very small. In a polycrystal, on the other hand, the oxide/metal interface is merely one segregation site among many grain boundaries over which the segregated sulphur is distributed.

Figure 2:
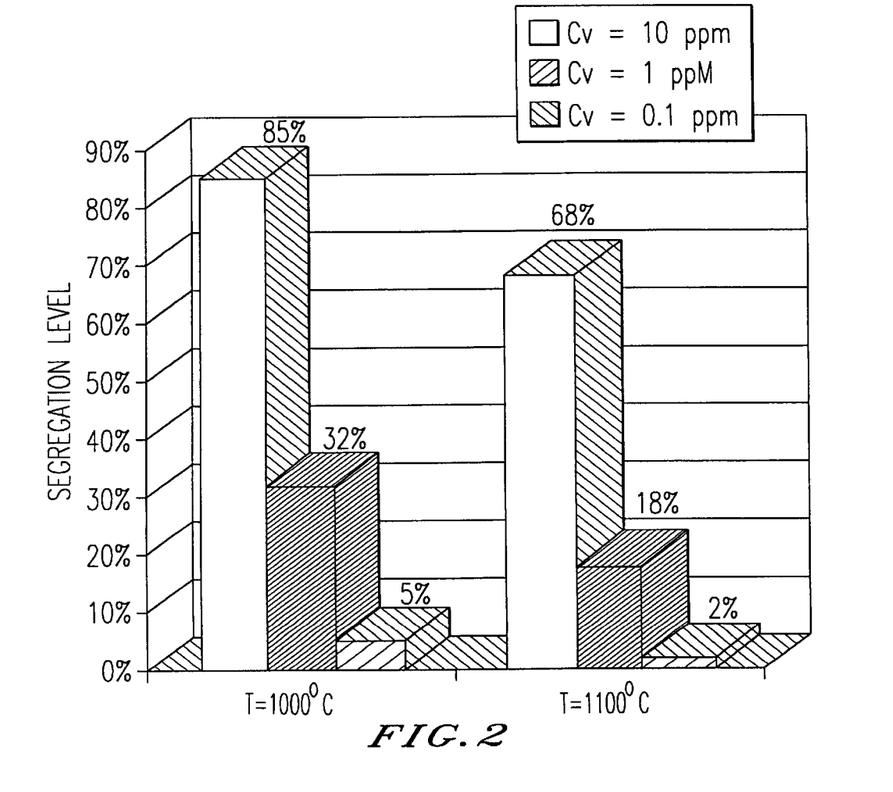
FIG. 2 is a diagram showing the effect of the concentration of sulphur in solution in the superalloy AM1 on the level of sulphur segregation at the free surface of the AM1.

We have made measurements of the free enthalpy of sulphur segregation at the free surface of AM1 and of a beta-NiAl coating. The measured values are approximately equal to $-140$ kJ per mole. This value can be considered as a maximum limit of the free segregation enthalpy at a beta-NiAl/alumina interface as well as at a grain boundary or at the surface of a pore in a beta-NiAl coating and in the AM1. FIG. 2 shows the effect of the concentration, Cv (in atomic ppm), of the sulphur in solution in the material on its segregation level at 1000° C. and 1100° C. calculated in accordance with the Maclean formalism for a free segregation enthalpy of $-140$ kJ/mol. The segregation level is expressed as a percentage of the maximum possible concentration of sulphur at the surface of the material. This maximum concentration is 0.5—i.e., 1 atom out of 2 in the atomic layer forming the free surface of the material. Beyond a segregation level of 0.1 (10%) the risk of detachment of the interface oxide layer is high. It can therefore be deduced that sulphur segregation at the surface of a porosity in the metal of the sublayer or at its interface with the alumina film becomes negligible if the residual sulphur content in the alloy and the heat barrier sublayer is reduced to the level of a few tenths of ppm.

To improve the oxidation and corrosion resistance of a superalloy article the invention proposes reducing the reactivity of the residual sulphur contained in the base alloy and using a method of depositing the coating or the sublayer which does not introduce sulphur. The free sulphur concentration in the superalloy must be at least lower than 0.8 ppm by weight and preferably below 0.2 ppm by weight. This sulphur content can be obtained in various ways:

- either by elimination by subjecting the superalloy to a desulphurizing heat treatment;
- or by using a pure casting of superalloy having a low sulphur content;
- or by entrapping sulphur by the addition of a reactive element such as yttrium.

These commonest methods are given as an example but do not themselves limit the scope of the invention. Any other method for reducing the free sulphur content of the superalloy can be used.

The various steps in the manufacture of the article and the deposition of the coating or sublayer must be clean enough to ensure an average sulphur concentration in the thickness of the deposit corresponding to the required residual sulphur content. Sulphur concentrations at these low levels are measured by glow discharge mass spectrometry, or GDMS for short.

Figure 3:
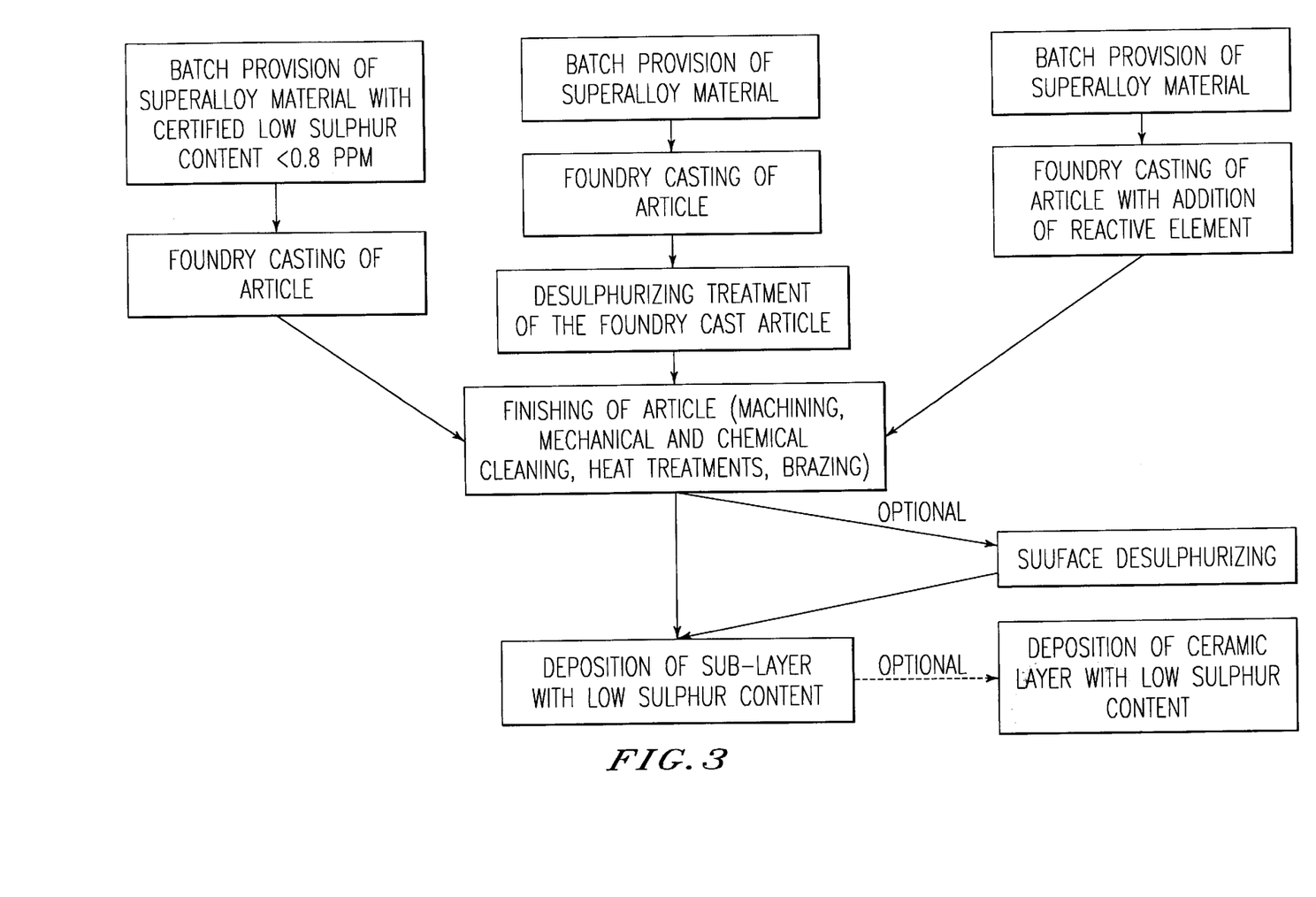
FIG. 3 is a block diagram identifying the steps in three variants of the method in accordance with the invention.

FIG. 3 indicates three different methods of manufacturing articles, such as distributors and rotor blades, coated with a protective coating or an EB-PVD heat barrier in accordance with the invention. In each case the heat barrier deposition is performed at the end of the manufacturing process, and the sulphur content of the ceramic must also be low.

The first step consists of reducing the reactivity of the free sulphur in the superalloy. In a first embodiment this first step consists of using desulphurized material immediately after its preparation. From the article-manufacturing viewpoint this route makes the foundry step a particularly delicate one in which drastic precautions are necessary to prevent the reintroduction of sulphur into the alloy during the casting of the article. In particular the refractory materials of which the foundry equipment, such as the remelt crucible, is made and the shells and cores used to form the mould for the article must be clean enough to prevent sulphur contamination of the article during casting. Once cast, the article undergoes the conventional finishing steps such as machining, mechanical and chemical cleaning and brazing.

In a second embodiment the concentration of free sulphur in the alloy is reduced by a desulphurizing treatment of the foundry cast article such as, for example, a solid-state desulphurizing heat treatment under hydrogen. This desulphurizing process makes use of the tendency of the sulphur dissolved in the alloy to segregate at the superalloy surface. In the presence of hydrogen at high temperatures the sulphur located on the article surface is removed by the formation and volatilisation of hydrogen disulphide and by simple evaporation. The sulphur pumping effected by the hydrogen creates a positive gradient of the concentration of the sulphur dissolved in the alloy from the surface towards the core of the article. This concentration gradient leads to the sulphur diffusing from the core of the article towards its surface. Since the desulphurizing kinetics are controlled by the sulphur diffusion kinetics in the alloy, this desulphurizing process uses high temperatures and treatment times proportional to the square of the thickness of the article to be desulphurized. This process is therefore of practical use only for blades or distributors with thin walls, and is more adapted to aeronautical parts than to industrial turbine parts which are usually much heavier. The treatment temperature must be metallurgically compatible with the alloy of the article, which is an extra constraint. In the case shown in FIG. 3 the desulphurizing treatment is applied to the raw foundry article in place of the solution heat treatment. In optimised conditions a few tens of hours at partial hydrogen pressure suffice to reduce the free sulphur concentration from a few ppm to less than 0.4 ppm by weight in the case of an AM1 blade wall less than 1 mm thick at treatment temperatures above the solution temperature of the constituents of the prime gamma phase alloy and below the incipient melting point. The heat treatment conditions must be sufficiently reducing to prevent oxide formation on the article surface since oxide formation would obstruct desulphurization. This desulphurizing heat treatment can be conducted in an inert atmosphere or in vacuo.

In a third embodiment, in order to reduce the activity of the sulphur in the alloy the method involves doping the alloy with reactive elements which interact with the sulphur to trap it in the core of the alloy. The sulphur-entrapping mechanism consists of forming sulphides and oxysulphides which are sufficiently stable at the operating temperature for the free sulphur content in solution to be sufficiently low at said temperature. One of the difficulties of this embodiment arises from the strong reactivity of the reactive elements with the refractory materials used in foundry work. The disappearance of the reactive elements by combination with the refractory materials used in foundry work makes it difficult to control the amount of their residual concentration in the article. The preferred method is to introduce the reactive element after the alloy has remelted during the operation of foundry casting of the article. This method makes it possible to adapt the quantity of reactive element to be added according to the geometry and wall thickness of the article. The content of the residual reactive element required in the blade portions of the articles varies typically between 10 and 100 ppm for an alloy initially containing 1 to 3 ppm of sulphur. Upon completion of the first step, finishing operations are carried out on the article obtained.

The finishing operations consist of dipping the articles in oily machining baths or acido-basic cleaning baths. Temperature rises due to heating by machining or to various heat treatments may also occur.

The sulphur pollution introduced by these various finishing stages remains superficial since it affects only a few microns of thickness. However, a typical pollution averaging 30 ppm to a depth of 5 microns is unacceptable because it is equivalent to increasing the average sulphur content by +0.2 ppm in a 0.8 mm thick blade wall. It may therefore be necessary to desulphurize the surface region of the article before proceeding with the deposition of the sublayer.

The aim of the optional step of surface desulphurization is to remove the sulphur introduced into the surface region of the article in the finishing operation. The preferred process for desulphurizing the surface of the article is to subject the article, in a deoxidised state, to a non-oxidising heat treatment for 2 hours at 850° C. in vacuo or at a partial argon and/or hydrogen pressure. At 850° C. the sulphur diffusion coefficient of a nickel based alloy is sufficient to desulphurize the alloy to a depth of several microns.

The second step of the method in accordance with the invention is to form a low sulphur content protective coating or heat barrier sublayer. This step requires considerable care if sulphur is not to be introduced into the deposit. The processes used in making antioxidation coatings or heat barrier sublayers call for operations such as:

chemical degreasing (acid or basic baths);

mechanical cleaning treatment (sanding, polishing and so on);

electrolytic deposition of nickel or precious metals;

thermochemical treatment (aluminization, chromization);

heat treatment;

chemical vapour deposition (CVD).

Each operation may introduce sulphur contamination of the coating during its preparation.

For example, sulphur contents of several ppm by weight were measured by GDMS in electrochemical depositions of platinum or nickel-palladium in the raw deposited state. We also found that the thermochemical process of chromization or aluminization may introduce more than a negligible quantity of sulphur into the deposit.

Such contents are unacceptable since they provide a very significant contribution to sulphur pollution of the antioxidation coating or heat barrier sublayer in its final preparation stage.

The sulphur contained in an electrolytic deposit originates from the surface preparation of the article made before the electrolytic deposition, and from the actual electrolytic deposit. To reduce sulphur pollution the contents of the sulphur species (sulphate and sulphite ions) present in the baths used for the chemical cleaning and degreasing treatments must be less than 1 ppm by weight. In electrolytic deposition it is crucial to avoid the trapping of sulphur species during preparation of the coating. The metal salts and solutions used for the deposition bath must be of a purity such that their sulphur content is less than 10 ppm by weight and preferably below 5 ppm by weight. If these conditions are observed the sulphur content of the raw electrolytic deposit can be less than 1 ppm by weight.

As an alternative to or in combination with the use of a high-purity electrolytic bath, the electrolytic deposit of a thickness between 5 and 15 microns may be partially desulphurized in the solid state during diffusion heat treatment conducted after the electrolytic deposition. Such a treatment precedes the step of aluminization in the case of aluminides modified by precious metals, and is also used for sublayers prepared by interdiffusion between a precious metal and the base alloy. This diffusion heat treatment is usually carried out in vacuo or at a partial pressure of an inert gas at a temperature between 850° C. and 1200° C. for from 1 to 3 hours. To reduce sulphur pollution a modification of this diffusion heat treatment is to introduce scavenging by between 5 and 10% hydrogenated gas of very high purity ($H_2S$ content below 1 ppm by weight) at a pressure between $10^{-2}$ and 10 Torr using a cold-wall furnace. The presence of hydrogen during the heat treatment helps to partially eliminate the residual sulphur contained in the electrolytic deposit.

For aluminide type coatings used as a heat barrier sublayer the heat treatment at partial hydrogen pressure described above can also be conducted after the aluminization step and before the deposition of the ceramic layer.

The thermochemical chromization and aluminization processes are also responsible for introducing sulphur into the sublayer. In an aluminization or chromization process the aluminum or chromium donor is placed together with the articles to be treated in a reactor with a quantity of activator. The function of the activator is to transport the aluminum or chromium from the donor to the surface of the articles to be treated. The activators used are halogenated compounds, typically chlorides or fluorides of ammonium or aluminum or chromium. The treatment is conducted in a reducing medium at atmospheric pressure or at a reduced pressure in an inert gas, which may or may not be mixed with hydrogen, or just in pure hydrogen. The treatment is at a temperature between 850° C. and 1200° C. for several hours. At these temperatures the materials used to treat the articles (equipment, cement (donor), activator) are potential sources of sulphur contamination of the deposit. The sulphur content of these sources is of the order of hundreds of ppm by weight, a very high value in the light of the required purity of the sublayer. In the presence, for example, of hydrogen the sulphur sources react to produce a partial pressure of hydrogen disulphide during the aluminization or chromization of the articles. This partial hydrogen disulphide pressure leads to surface sulphur adsorption by the articles. The adsorbed sulphur is then incorporated in the coating during the growth of the deposit.

A first method of minimising the uptake of sulphur into the coating during chromization or aluminization is to reduce the sulphur content of the sources of contamination. To this end desulphurization of the equipment is effected, for example, by a heat treatment in a hydrogen atmosphere, and the free sulphur level in the cement is reduced. The cement, which is an alloy of chromium or aluminum or nickel in powder or granular form, can be alloyed with a few percent of yttrium or other reactive elements to trap the residual sulphur.

A second method which can be used together with the previous method is to reduce the partial hydrogen disulphide pressure by the use of a getter chemical element which reacts with the sulphur to form sulphides which are stable at the treatment temperature. The sulphur getter can be metallic, in which case the metal used must be inert with respect to the halides used if the deposit is not to be contaminated. Alloys containing zirconium or titanium make good getters. The sulphur getter can also be an oxide forming oxysulphides, for example, by the use of yttria mixed with the cement.

Various experiments which illustrate all the advantages of the present invention are described in the following examples.

EXAMPLE 1

Test samples in the form of discs 1 mm thick and 25 mm in diameter were cut from a cast AM1 bar solution treated for 3 hours at 1300° C. under partial argon pressure. The sulphur content of the discs measured by GDMS was 0.85 ppm. Half of the test samples were given a desulphurizing treatment in the solid state by heat treatment under hydrogen as hereinbefore described to reduce the free sulphur concentration in the superalloy AM1. The treatment temperature and time were 1300° C. and 30 hours respectively, with a slight overpressure of 10% hydrogenated argon. The measured residual sulphur content of the desulphurized discs was 0.2 ppm.

The two sets of test samples (desulphurized and nondesulphurized) were then treated as a single batch for an EB-PVD heat barrier deposition with a sublayer of platinum-modified aluminide. The process for depositing the sublayer consisted of an electrolytic predeposition of platinum several microns thick, followed by diffusion treatment at 1100° C. for 5 hours. The predeposition of platinum and the aluminization with hydrogen scavenging were performed in conditions aimed at minimising the uptake of sulphur.

GDMS sulphur analyses were made of the platinum aluminide sublayers deposited on the standard and desulphurized AM1 test samples. The analyses were made at different depths in the sublayer in association with consecutive polishings. The sulphur level through the sublayer deposited on standard AM1 varies between 0.2 and 0.9 ppm by weight with an average value of 0.5 ppm. The sulphur level of the desulphurized AM1 varies between 0.2 and 0.7 ppm by weight with an average value of the order of 0.3 ppm. Although the sublayer deposition process was strictly the same for all samples, some of the sulphur contained in the base alloy diffused through the sublayer during the aluminization step, resulting in a higher content in the aluminide sublayers formed on the non-desulphurized substrates. One of the test sample surfaces was then covered by a 125 micron thick EB-PVD ceramic layer having the composition $ZrO_2$–8% $Y_2O_3$ by weight.

Figure 4:
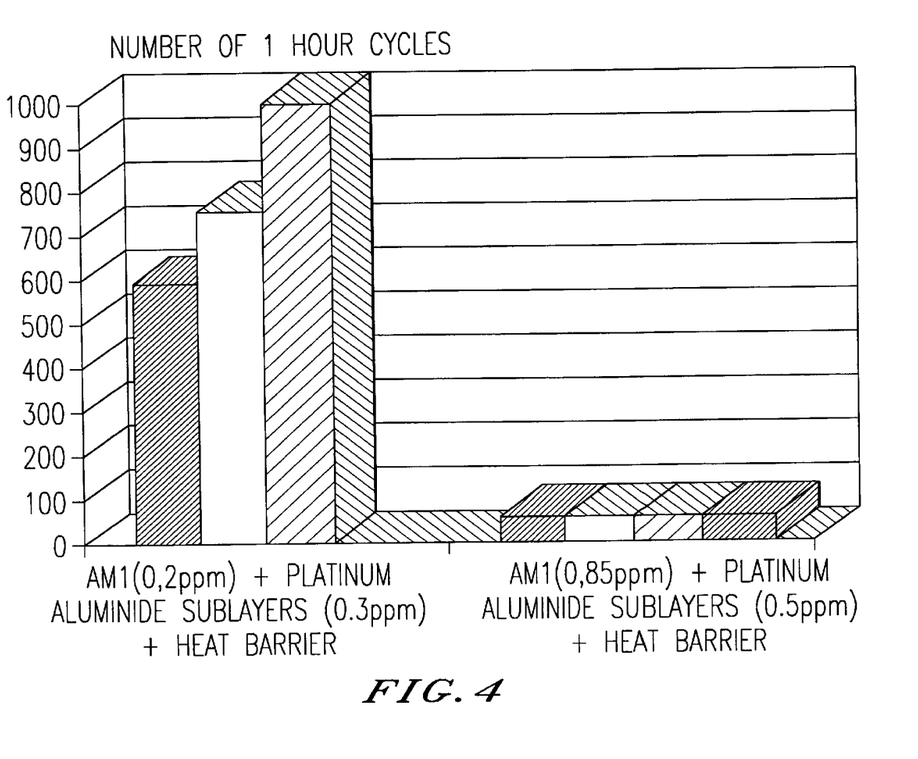
FIG. 4 shows a comparative table and a diagram indicating the influence of the superalloy sulphur content on the working life of a heat barrier deposited on a low sulphur content sublayer.

The spalling resistance of the ceramic layer was evaluated by subjecting the samples to an oxidising heat cycling test. Each cycle had a total duration of 75 minutes, of which 60 minutes were at a temperature of 1100° C., and return to ambient temperature was by forced convection. The test was stopped when 20% of the coated surface of the sample had spalled. FIG. 4 shows the cycling results obtained from 3 or 4 test samples.

An electron microscope analysis shows that in the case of the non-desulphurized alloy samples, spalling occurred mainly by cracking at the interface between the metal of the sublayer and the alumina film. Lack of adhesion between the oxide and the metal is due to the sulphur segregation phenomenon. On the other hand, in the case of the desulphurized samples the spalling occurred by cohesive rupture in the alumina and in the ceramic layer near the interface, and by propagation at the alumina/sublayer interface.

This experiment shows that the use of a protective coating deposited under conditions in which the added sulphur content is strictly controlled does not provide satisfactory results, and the combined use of an alloy having a low free sulphur content and of a coating having a low sulphur content is necessary to produce any substantial improvement in the spalling resistance of a heat barrier. A sublayer of aluminide having a low sulphur content deposited on a desulphurized alloy has greater resistance to oxidation than the same sublayer deposited on a nondesulphurized alloy.

EXAMPLE 2

Figure 5:
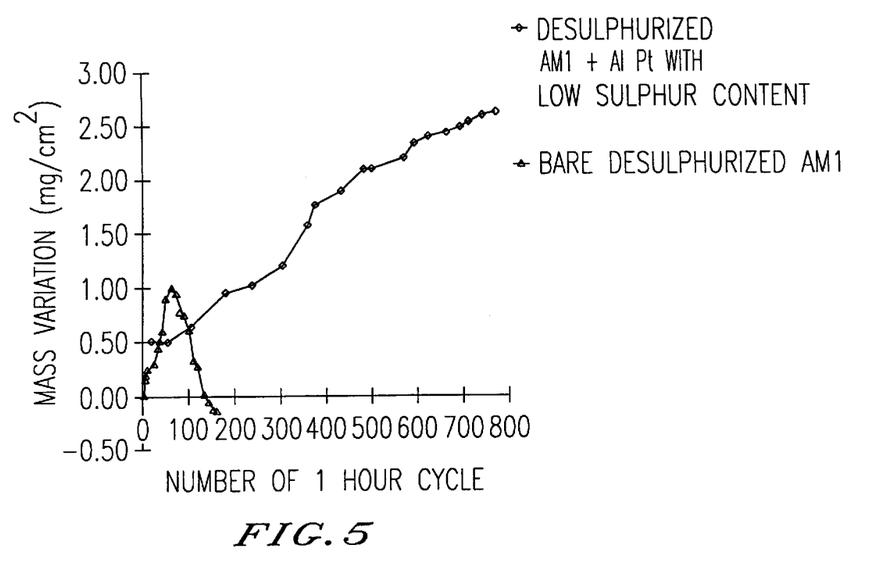
FIG. 5 shows weight change graphs showing the effect of the presence of a low sulphur content antioxidation coating on the working life of a desulphurized superalloy under oxidation conditions.

Test sample discs 12 mm in diameter and 1 mm thick were machined from a cast bar of AM1 and given a desulphurizing treatment as described in Example 1. A first group of the desulphurized samples were coated with a platinum-modified aluminide sublayer having a sulphur content of less than 0.2 ppm by weight. A second group of the samples were left bare. The sample discs were then subjected to cycled oxidation in atmospheric air under the conditions described in Example 1. The samples were weighed periodically. The variations in mass per unit area are shown in FIG. 5. It is known that for an alumino-forming alloy the average alumina thickness formed (in microns) in the absence of spalling is proportional to the mass increase (mg/cm$^2$), the proportionality coefficient being 5.339. At the end of 60 cycles the mass variation of the bare desulphurized alloy peaked at 1 mg/cm$^2$ (corresponding to 5.3 microns of alumina), and after 130 cycles the mass variation was again nil. At this stage at least 5 μm of oxide had therefore detached from the surface. If the sample had been coated with a heat barrier as described in U.S. Pat. No. 5,538,796 the life of the coating could not have exceeded 130 cycles. In the case of the desulphurized alloy coated with a low sulphur content sublayer more than 700 cycles must be experienced to observe a mass loss corresponding to spalling of the oxide. This shows firstly that the anti-oxidation coating formed in accordance with the invention is very effective, and secondly that in the presence of a heat barrier layer it offers a potential working life before spalling much greater than that described in U.S. Pat. No. 5,538,796.

The life of the ceramic layer in terms of number of cycles up to 20% spalling of the coated surface of the test sample is above 500 cycles with a platinum aluminide sublayer having a low sulphur content (0.3 ppm) on desulphurized AM1 (0.2 ppm).

EXAMPLE 3

Figure 6:
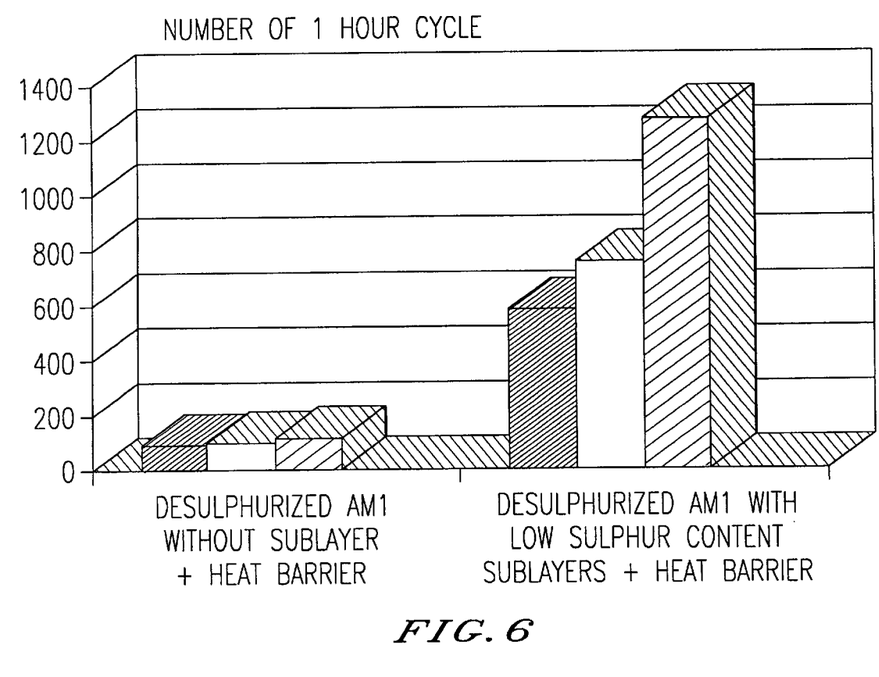
FIG. 6 is a diagram showing the difference in the working life of a heat barrier deposited on a desulphurized alloy without a sublayer and a heat barrier on a desulphurized alloy with a low sulphur content sublayer.

The desulphurized AM1 alloy test samples with and without a sublayer described in Example 2 were coated with a 125 μm thick yttriated zirconia heat barrier by EB-PVD. These samples were furnace cycled by the process described in Example 1. The lives under cycling are indicated in FIG. 6, which shows that the heat barrier coatings formed in accordance with the invention behave better than the heat barrier coatings described in U.S. Pat. No. 5,538,796.

EXAMPLE 4

Test samples in the form of discs were prepared from a standard AM1 bar and an AM1 bar doped with 300 ppm by weight of yttrium. The total measured sulphur level of these bars was 2.6 ppm by weight. Two different sublayers were deposited on these samples, one being a standard platinum sublayer obtained by electrolytic deposition of platinum on the AM1 superalloy followed by diffusion annealing of the deposit, and the other being a low sulphur content platinum sublayer obtained by eliminating the uptake of sulphur during the electrolytic platinum deposition by the use of a low sulphur content platinum bath, and then diffusion annealing the deposit in a hydrogenated atmosphere. These two sublayers were applied to standard AM1 samples and to yttrium-doped AM1 samples.

Figure 7:
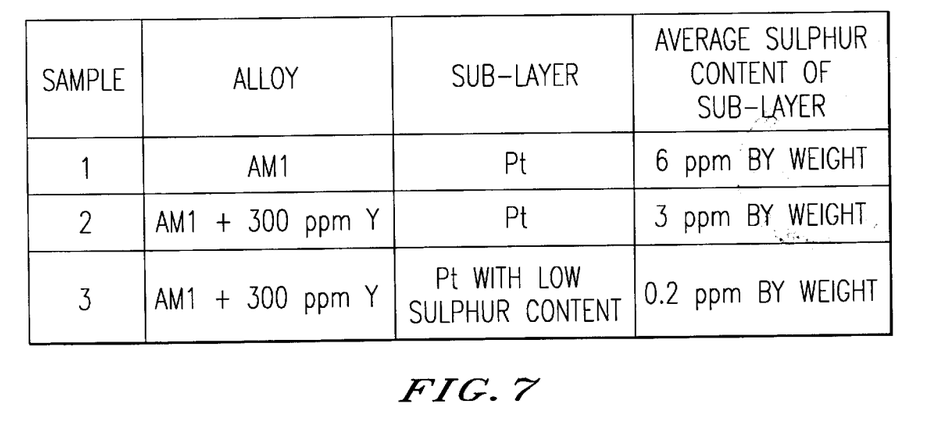
FIG. 7 is a table showing the effect of introducing yttrium into the superalloy on the measured sulphur content of a heat barrier sublayer.

GDMS analyses were made of the platinum sublayers deposited on the standard AM1 and on the AM1+Y samples, and of the low sulphur content platinum sublayer deposited on AM1+Y samples. The analysis was carried out over 2 hours, during which time five measurements were recorded as the sublayer surface was eroded by the luminescent discharge in the GDMS analysis. The average sulphur content values determined through a crater several microns deep are given in FIG. 7.

Of these samples, only samples 3 correspond to the invention since they comprise an AM1 alloy having a low free sulphur content together with a protective coating or a heat barrier sublayer having a low sulphur content.

The results show that the presence of yttrium in the alloy prevents sulphur enrichment of the electrolytic platinum deposit during diffusion annealing thereof. The sulphur of the alloy is entrapped by the yttrium and does not diffuse towards the platinum.

Figure 8:
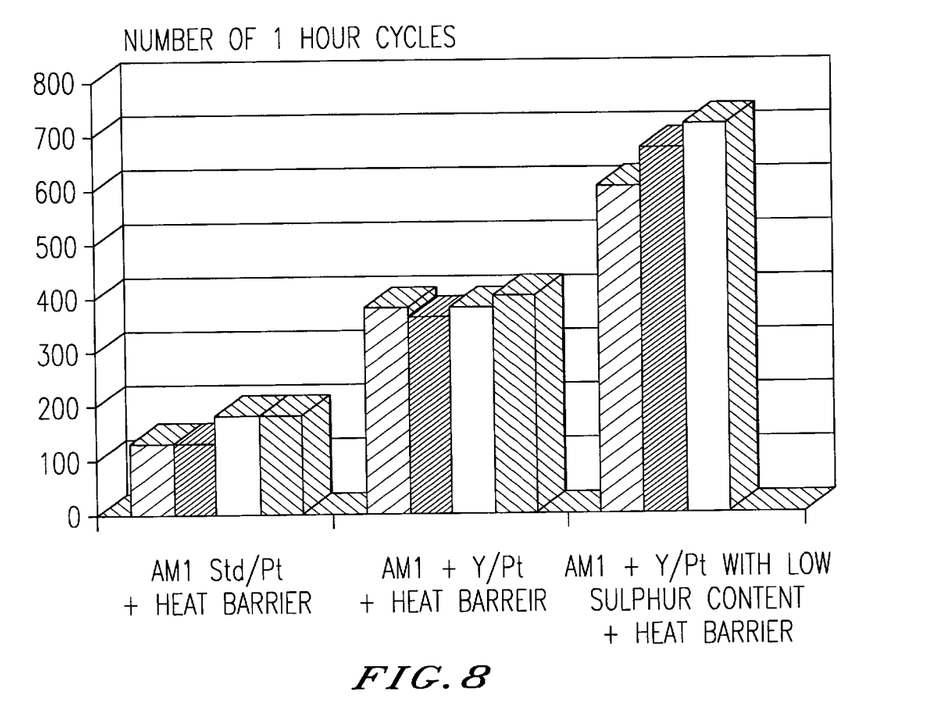
FIG. 8 is a diagram showing the effect of introducing yttrium into the superalloy on the working life of a heat barrier deposited on a platinum sublayer.

An yttriated zirconia heat barrier 125 μm thick was applied to these samples by EB-PVD and the spalling resistance of the EB-PVD ceramic was evaluated by heat cycling in accordance with the standard conditions described in Example 1. The results are shown in FIG. 8.

The entrapment of the sulphur in the AM1 alloy by the addition of a reactive element such as yttrium does not improve the performance of the platinum sublayer sufficiently to make the EB-PVD ceramic layer adhere for a satisfactory length of time. The trapping of the sulphur by the yttrium in the AM1 alloy is insufficient to prevent segregation of sulphur at the alumina-metal interface, the takeup of sulphur into the sublayer being due to the deposition process. On the other hand, with a low sulphur content pure platinum sublayer deposited on the AM1+Y sample in accordance with the invention, distinctly better results are obtained.

EXAMPLE 5

Test samples of standard AM1 alloy and of AM1 alloy desulphurized in the solid state by the desulphurizing process described in Example 1 were prepared in the form of 25 mm diameter discs. The residual free sulphur content of the desulphurized samples was between 0.12 and 0.16 ppm by weight.

Aluminide deposits modified by palladium and by chromium were made on these two different samples. A predeposition of palladium and nickel (80%/20% by weight) was first deposited electrolytically on the alloy, followed by a diffusion heat treatment. The samples were then chromized and aluminized by a vapour phase process as described earlier. These coatings were deposited on the standard and desulphurized AM1 samples using conventional electrolytic and thermochemical processes and with a low sulphur content. The following samples were thus obtained:

1. Standard AM1+a conventional aluminide coating modified by Pd and Cr;
2. Desulphurized AM1+a conventional aluminide coating modified by Pd and Cr; and
3. Desulphurized AM1+an aluminide coating modified by low sulphur content Pd and Cr.

Heat barrier ceramic coatings of yttriated zirconia were then deposited on these samples to a thickness of 125 μm, and the resulting coatings were tested by heat cycling in accordance with the test conditions described in Example 1. The results obtained for sample types 2 and 3 showed that in the case of these samples the working lives of the heat barrier were respectively 1.5 and 5 times greater than for the type 1 samples.

This example shows once again the need for combining desulphurization of the base alloy with a deposition process for the AlPdCr sublayer which introduces little free sulphur into the final coating.

EXAMPLE 6

In this example the procedure was as in Example 5 except for the omission of the final step of depositing a ceramic coating.

Samples having the following antioxidation coatings were obtained:
1. Standard AM1+a conventional aluminide coating modified by Pd and Cr; and
2. Desulphurized AM1+an aluminide coating modified by low sulphur content Pd and Cr.

These samples were subjected to thermal cycling at 1100° C. in accordance with the procedure described in Example 2.

Figure 9A:
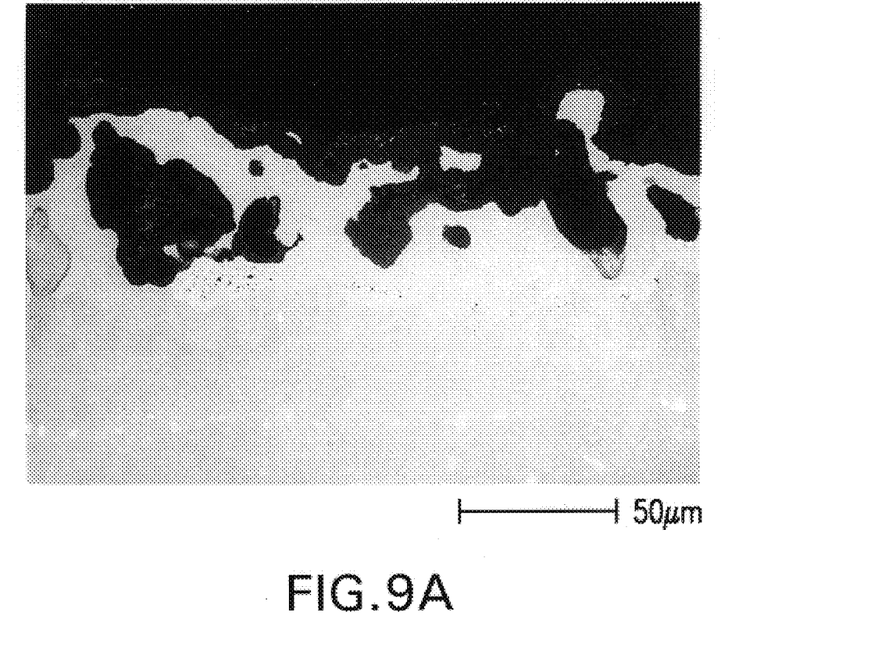
FIGS. 9a and 9b are photographs showing the advantageous effect of desulphurizing the alloy and the coating on the oxidation resistance of an aluminide coating modified by palladium and chromium.
Figure 9B:
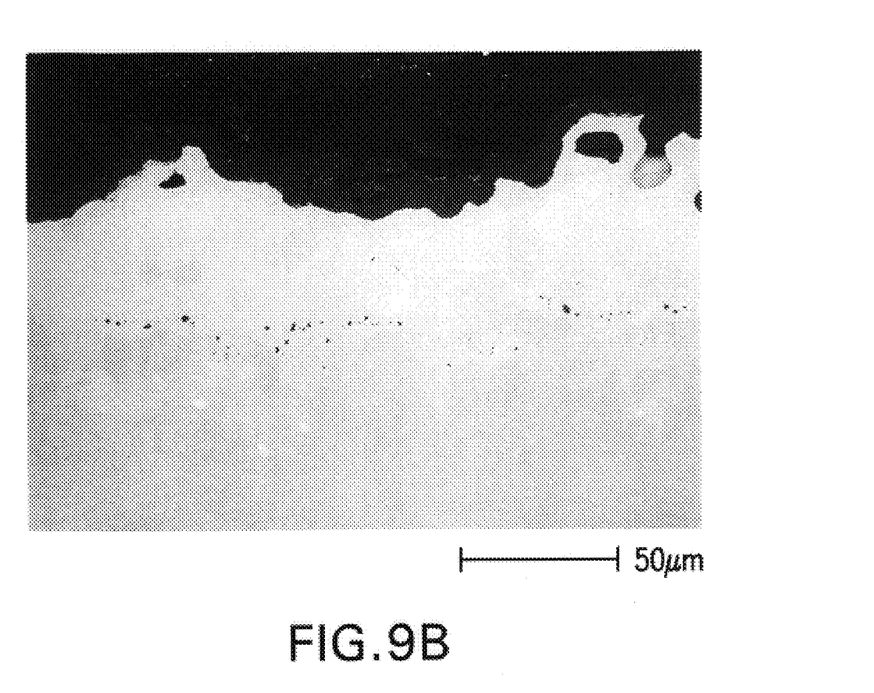
Figure 10:
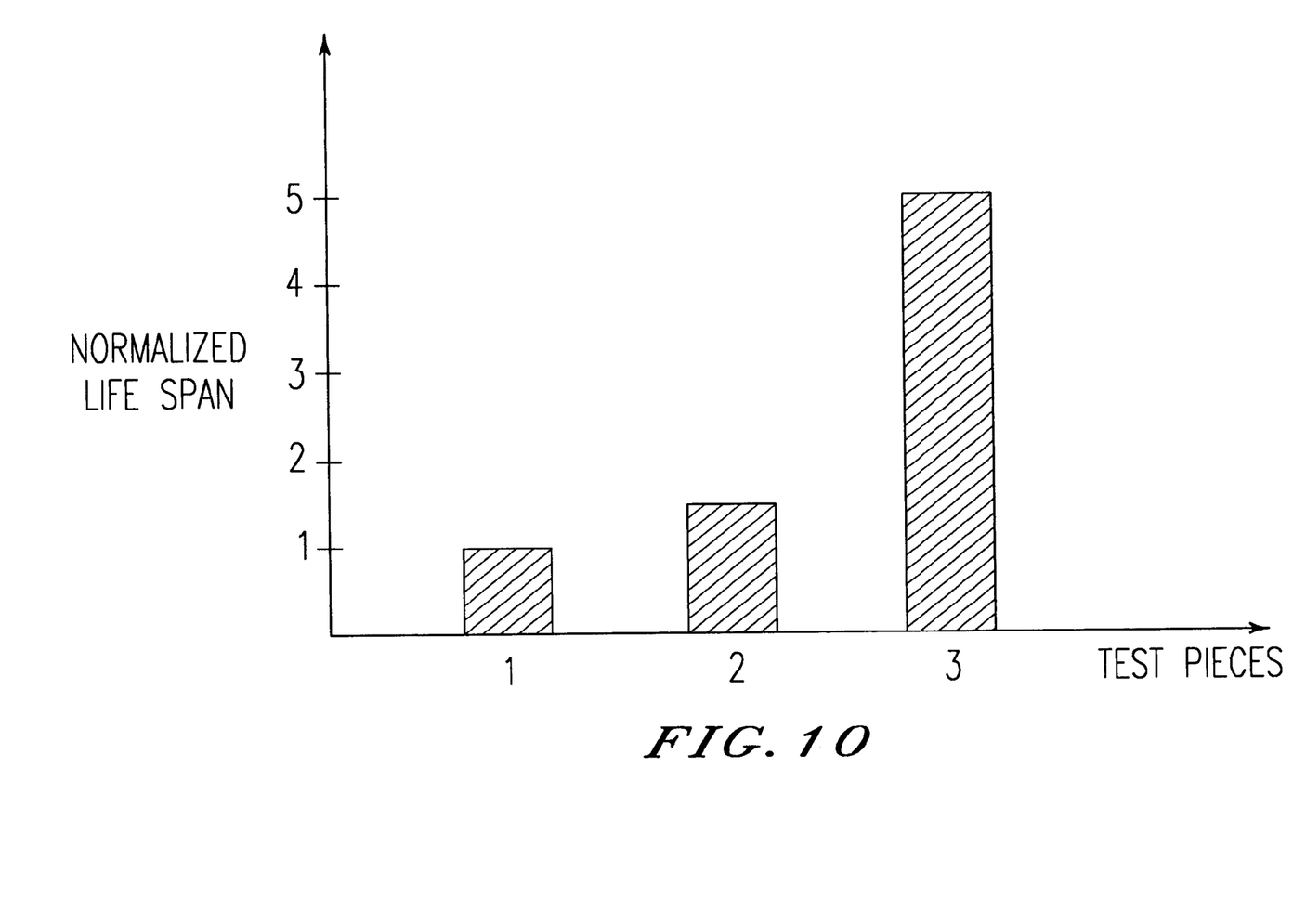
FIG. 10 graphically illustrates the normalized life span of samples (test pieces) described in Example 5. Test piece: 1 (standard AM1 alloy+conventional aluminide coating modified with Pd and Cr), 2 (desulfurized AM1 alloy+conventional aluminide coating modified with Pd and Cr) and 3 (desulfurized AM1 alloy+aluminide coating modified with low sulfur content Pd and Cr).

FIGS. 9a and 9b show the effect of desulphurizing the base alloy on the life of the AlPdCr coating after more than 400 oxidation cycles at 1100° C. FIG. 9a shows that the coating deposited on the standard AM1 sample exhibits internal oxidation of the deposit. FIG. 9b shows that the AlPdCr coating deposited on the desulphurized AM1 sample is virtually free from oxide cavities. After 450 cycles it still has a good potential working life. This example shows the added value of desulphurization on the oxidation resistance of the protective AlPdCr coating. The effect of the sulphur on the cavitation observed in the coating is to boost the coalescence of the gaps associated with aluminum and nickel diffusion and their growth into macroporosities.

We claim:

1. A superalloy article comprising a superalloy substrate having a free sulfur content less than 0.8 ppm by weight, and a protective antioxidation coating having a sulfur content less than 0.8 ppm by weight, wherein said protective coating is an aluminide coating.

2. A superalloy article according to claim 1, wherein the sulfur content of said substrate and of said protective coating is below 0.2 ppm by weight.

3. A superalloy article according to claim 1, wherein said aluminide coating contains at least one metal selected from the group consisting of nickel, platinum, palladium, ruthenium, rhodium and chromium.

4. A superalloy article according to any one of claims 1 to 3, wherein said protective coating serves as a heat barrier sublayer and is covered by a ceramic layer of columnar structure.

5. A superalloy article according to claim 4, wherein said ceramic layer consists of zirconia, stabilized by yttrium oxide.

6. A superalloy article according to claim 4, wherein said ceramic layer is deposited by electron beam vapour phase deposition.

* * * * *

UNITED STATES PATENT AND TRADEMARK OFFICE
CERTIFICATE OF CORRECTION

PATENT NO.    : 6,228,513 B1
DATED         : May 8, 2001
INVENTOR(S)   : Yann Jaslier et al.

Page 1 of 1

It is certified that error appears in the above-identified patent and that said Letters Patent is hereby corrected as shown below:

<u>Column 4,</u>
Lines 9-10, "mon-crystals" should read -- mono-crystals --.

<u>Column 5,</u>
Line 60, "lower is the density" should read -- lower the density --.

Signed and Sealed this

Twenty-fifth Day of December, 2001

Attest:

JAMES E. ROGAN
Attesting Officer      Director of the United States Patent and Trademark Office